Patented July 6, 1948

2,444,689

UNITED STATES PATENT OFFICE 2,444,689

METHOD OF INCREASING THE PARTICLE SIZE OF SYNTHETIC RUBBER LATEX AND FORMING A FILM THEREFROM

Edward A. Willson, Akron, Ohio, assignor to The B. F. Goodrich Company, New York, N. Y., a corporation of New York No Drawing. Application June 7, 1943, Serial No. 489,986. In Canada April 21, 1943

2 Claims. (Cl. 18—58.4)

This invention relates to the treatment of synthetic rubber latex of the type prepared by the polymerization in aqueous emulsion of a butadiene-1,3 hydrocarbon and particularly to a method whereby the particle size of such latex may be increased.

It is known that the size of the synthetic rubber particles in synthetic rubber latex is much smaller, usually only from $\frac{1}{5}$ to $\frac{1}{10}$ as great, as the size of the rubber particles in Hevea latex. This great difference in particle size has made it extremely difficult, if not impossible, to apply many of the established practices for Hevea latex to synthetic latex. For instance, the extremely large surface presented by the small particles in synthetic latex renders the latex much less stable than Hevea latex, and as a result, large amounts of an emulsifying or dispersing agent must be added to keep the particles dispersed in the water. The presence of large amounts of emulsifying agent, however, is detrimental to the properties of films formed from the synthetic latex. Furthermore, the particles of synthetic rubber pack so closely during ionic coagulation or electrodeposition processes that only very thin films are formed.

It is accordingly an object of this invention to provide a method for increasing the size of the particles of synthetic rubber in synthetic rubber latex. It is a further object of this invention to provide synthetic rubber latex which can be deposited by ionic coagulation or electrodeposition and otherwise treated in much the same manner as Hevea latex. Further objects will become apparent from the following description of the invention.

I have discovered that the particle size of synthetic rubber in synthetic rubber latex may be increased by the addition thereto of certain ionizable water-soluble salts, to be hereinafter described, in quantities insufficient to coagulate the latex. It has previously been known that salts can be employed to coagulate synthetic rubber latices, but it has not been known that the addition of quantities of salts insufficient to effect coagulation will produce an increase in particle size, thereby improving the properties of the latex and increasing its stability. It has also been known that the presence of salts during emulsion polymerization of butadiene-1,3 hydrocarbons will maintain the fluidity of the emulsion during polymerization, but the presence of salts in the latex as prepared does not insure the formation of the desired particle size in the latex.

The synthetic rubber latex which is used in the method of this invention may be any latex prepared by the polymerization in aqueous emulsion of a butadiene-1,3 hydrocarbon such as butadiene-1,3, isoprene, 2,3-dimethyl butadiene-1,3, piperylene or the like, either alone or in admixture with each other and/or in admixture with lesser or equal amounts of one or more monoethylenic compounds copolymerizable therewith in aqueous emulsion such as acrylonitrile, methacrylonitrile, alpha-chloro acrylonitrile and similar acrylic nitriles; styrene, vinyl naphthalene, p-chlorostyrene and similar aryl olefins and substituted aryl olefins; methyl acrylate, methyl methacrylate acrylamide and similar esters and amides of acrylic acids; methyl isopropenyl ketone, vinylidene chloride, isobutylene, methyl vinyl ether and other compounds containing a single ethylenic double bond, $>C=C<$, which are copolymerizable with butadiene-1,3 hydrocarbons in aqueous emulsion. Synthetic rubber latices prepared from non-hydrocarbon butadienes-1,3 such as chloroprene are not included, however, since the treatment of such latices is essentially different because of the liberation of traces of hydrochloric acid from such a rubber.

The emulsifying agent employed in the emulsion polymerization may be any of the well-known emulsifying agents for emulsion polymerization processes including fatty acid soaps such as sodium laurate, sodium myristate, sodium palmitate, sodium oleate or mixtures thereof; alkali metal sulfates derived from fatty alcohols containing at least ten carbon atoms such as sodium lauryl sulfate, potassium myristyl sulfate and the like; alkali metal sulfonates derived from aryl and alkylaryl sulfonic acids such as sodium naphthalene sulfonate, sodium isopropyl naphthalene sulfonate, sodium di-isobutyl naphthalene sulfonate, sodium lauryl benzene sulfonate and the like; salts of high molecular weight organic bases such as cetyl trimethyl ammonium sulfate, the hydrochloride of diethyloleylamide and the like and other well known emulsifying agents. However, in the method of this invention it is preferred to employ emulsifying agents which are stable in both acid and alkaline media since latices containing such emulsifying agents are more stable to the compounding ingredients ordinarily added to the latices, are capable of yielding films of greatest usefulness, and are more susceptible to treatment with salts by the method herein described to increase their particle size. The alkali metal higher alkyl sulfates and the alkali metal aryl and alkylaryl sulfonates mentioned above are preferred examples of such acid and alkali-stable emulsifying agents.

The ionizable water-soluble salts which are added to synthetic rubber latices by the method of this invention may be any ionizable water-soluble salt comprising a cation of a water-soluble base and an anion of a water-soluble inorganic acid or a water-soluble organic acid containing less than 10 carbon atoms. The term "water-soluble" as used herein is meant to refer to salts, bases or acids which will dissolve in water forming true solutions as distinguished from colloidal solutions, to an appreciable extent, say to an extent of at least 1 g. in 100 cc. of water at 20° C. and preferably, when the term is used to refer to a salt, to an extent of at least 10 g. in 100 cc. of water at 20° C. Examples of such ionizable water-soluble salts include the alkali metal, alkaline earth metal, ammonium, quaternary ammonium and zinc ammonium salts of water-soluble inorganic acids such as the strong mineral acids (hydrochloric, nitric and sulfuric), boric, carbonic, chloric, perchloric, hydroiodic, hydrobromic, phosphoric, cyanic, thiocyanic, sulfurous and persulfuric acids; of water-soluble organic carboxylic acids containing less than 10 carbon atoms such as acetic, propionic, oxalic, citric, and tartaric acids, and of other water-soluble organic acids containing less than ten carbon atoms such as the lower alkyl sulfuric acids, lower alkyl and aryl sulfonic acids and even phenol. Acid salts, basic salts, complex salts, double salts, etc., are all included provided they are ionizable and water-soluble and yield when ionized a cation of a water-soluble base and an anion of a water-soluble inorganic or organic carboxylic acid. The preferred salts are those which ionize to yield cations which are monovalent such as the alkali metal, ammonium and zinc ammonium ions and anions of moderately strong acids, preferably those having an ionization constant of at least $1 \times 10^{-5}$. Salts of this type which dissolve to give substantially neutral (not alkaline or acidic) solutions such as the alkali metal salts of strong mineral acids and the ammonium salts of weak acids are especially preferred.

The amount of the salt added to the latex may be varied considerably provided an amount insufficient to effect irreversible coagulation of the latex is used. Very small amounts of salt have been found to effect remarkable increases in the particle size of the latex. The particular amount will depend upon the nature and concentration of the synthetic rubber in the latex and the nature and amount of emulsifying agent present. Smaller amounts of salt are required when working with a latex containing a butadiene-1,3 acrylic nitrile copolymer synthetic rubber than when working with, for example, a butadiene-1,3 styrene copolymer rubber since the former is oil resistant and the emulsifying agent does not adhere to the rubber particles. Smaller amounts of salt are also employed when the latex contains an acid and alkali stable emulsifying agent such as a sodium alkyl benzene sulfonate than when the latex contains soap as the emulsifying agent. For synthetic rubber latices containing from 25 to 50% by weight of a butadiene-1,3 hydrocarbon acrylic nitrile copolymer rubber and from 4 to 8% of a sodium alkyl benzene sulfonate emulsifying agent, from 0.1 to 1%, and preferably from 0.5 to 0.7% of salt based on the latex is ordinarily employed. On the other hand, when from 4 to 8% of soap is employed as the emulsifying agent in the copolymerization of butadiene-1,3 and styrene to form a 30% latex, as much as 10 or 15% of salt based on the latex may be employed.

The salts are ordinarily added in the form of a dilute aqueous solution since high local concentrations of salt may cause coagulation. However, efficient stirring during addition will minimize this possibility. Although acids or alkalies may be added along with the salt, it is preferred to add the salt without effecting a change in the pH of the latex. After addition of the salt the latex is preferably allowed to stand with stirring and/or with heating to from 50–100° C. for a few hours until the particles of synthetic rubber have grown to the desired size. The latices thus obtained have a particle size approaching that of Hevea latex and may be treated in much the same manner as Hevea latex. For instance, they may be concentrated, compounded and used to produce synthetic rubber articles by coagulant dip and electrodeposition processes. They are stable and may be mixed with Hevea latex to form stable mixed latices.

As a specific example of the invention, 55 parts by weight of butadiene and 45 parts of acrylonitrile were copolymerized in aqueous emulsion to form a synthetic rubber latex containing about 38% of rubber and about 5% of a sodium alkyl benzene sulfonate. The size of the particles was too small to permit accurate measurement by ordinary microscopic methods, but seemed to average between 0.1 and 0.2 micron. 24 parts of a 2½% aqueous solution of sodium chloride were added with stirring to the latex. The latex was then heated for 2 hours at 70° C. At the end of this time, the particles were remarkably uniform in size and were about 0.4 micron in diameter. The latex was more stable than before the addition of the salt, and there was an excess of emulsifying agent present as shown by the soapy character of the latex. Furthermore, the latex gave a much improved deposit upon an impervious form coated with a coagulant, and a very satisfactory deposit was obtained from the latex by an electrodeposition process. Other water-soluble salts such as potassium nitrate, sodium sulfate, sodium bicarbonate, ammonium carbonate, ammonium citrate, zinc ammonium acetate, ammonium acetate, ammonium sulfate, ammonium thiocyanate, and potassium dihydrogen phosphate were employed in place of the sodium chloride, and in every case the properties of the latex were affected in the same manner and a stable latex containing uniform synthetic rubber particles of about 0.4 micron in diameter was produced.

The heating process in the above specific example is helpful in accelerating the production of uniform particles of increased size, but it is by no means essential to the successful operation of the invention, for the growth of the particles starts as soon as the salt solution is added and continues until the particles are uniformly about 0.4 micron in dameter if the contact with the salt solution is maintained for a sufficient time.

Although I have herein disclosed specific embodiments of my invention, I do not intend to limit the invention solely thereto for many variations and modifications are within the spirit and scope of the invention as defined in the appended claims.

This application is a continuation-in-part of my former application Serial No. 442,368, filed May 9, 1942, now abandoned.

I claim:

1. The method of producing a synthetic rubber deposit directly from a synthetic rubber latex prepared by the polymerization, in an aqueous emulsion containing an acid and alkali stable emulsifying agent, of a mixture of butadiene-1,3 and a monoethylenic compound copolymerizable therewith in aqueous emulsion, the said mixture containing at least 50% by weight of butadiene-1,3, which method comprises adding to said latex a dilute aqueous solution of an ionizable water-soluble salt composed of a monovalent cation of a water-soluble base and an anion of a water-soluble acid having a dissociation constant not less than $1 \times 10^{-5}$ and being selected from the class consisting of water-soluble inorganic acids and water-soluble organic acids containing not more than six carbon atoms, in an amount insufficient to effect irreversible coagulation of the latex, said amount being from 0.1 to 1% by weight based on the latex, heating the latex to a temperature of 50 to 100° C. for about two hours whereby substantially to increase the size of the synthetic rubber particles in the said latex, and dipping a form coated with a coagulant in the salt-treated latex whereby to obtain a strong coherent film of synthetic rubber deposited on the form.

2. The method of producing a synthetic rubber deposit directly from a synthetic rubber latex prepared by the polymerization, in an aqueous emulsion containing an alkali metal alkylaryl sulfonate as the emulsifying agent, of a mixture of butadiene-1,3 and a lesser amount of acrylonitrile which method comprises adding to said latex an alkali metal salt of a strong mineral acid in an amount insufficient to effect irreversible coagulation of the latex, said amount being from 0.1 to 1% by weight based on the latex heating the latex to a temperature of 50 to 100° C. for about 2 hours whereby the size of the synthetic rubber particles in the latex is increased from less than about 0.2 micron in average diameter to at least about 0.4 micron in average diameter, and dipping an impervious form coated with a coagulant in the latex whereby to obtain a strong coherent film of synthetic rubber deposited on the form.

EDWARD A. WILLSON.

REFERENCES CITED

The following references are of record in the file of this patent:

UNITED STATES PATENTS

| Number | Name | Date |
|---|---|---|
| 1,775,882 | Young | Sept. 16, 1930 |
| 1,967,861 | Collins | July 24, 1934 |
| 1,973,000 | Konrad | Sept. 11, 1934 |
| 2,109,968 | Collins | Mar. 1, 1938 |
| 2,115,561 | Ogilby | Apr. 26, 1938 |
| 2,161,949 | Calcott et al. | June 13, 1939 |
| 2,230,138 | Ewart | Jan. 28, 1941 |
| 2,234,076 | Gumlich | Mar. 4, 1941 |
| 2,323,313 | Dennstedt | July 6, 1943 |
| 2,333,403 | Youker | Nov. 2, 1943 |
| 2,338,517 | Kitani | Jan. 4, 1944 |
| 2,343,089 | Smith | Feb. 29, 1944 |
| 2,343,090 | Smith | Feb. 29, 1944 |
| 2,357,861 | Willson | Sept. 13, 1944 |
| 2,359,698 | Uhlig | Oct. 3, 1944 |

FOREIGN PATENTS

| Number | Country | Date |
|---|---|---|
| 286,272 | Great Britain | June 4, 1929 |
| 496,443 | Great Britain | Nov. 30, 1938 |
| 662,121 | Germany | July 5, 1938 |
| 850,829 | France | Dec. 27, 1939 |